3,097,182
COMPOSITION COMPRISING HALOGENATED BUTYL RUBBER AND A THIOALDEHYDE TRIMER
Delmer L. Cottle, Highland Park, and Leon S. Minckler, Jr., Metuchen, N.J., assignors to Esso Research and Engineering Company, a corporation of Delaware
No Drawing. Filed Sept. 26, 1960, Ser. No. 58,180
8 Claims. (Cl. 260—43)

The present invention relates to improved vulcanizable compositions of halogenated rubbery polymers. More particularly, it deals with curing halogenated isoolefin-multiolefin copolymers, e.g. halogenated butyl rubber, at an accelerated rate to give a vulcanizate of improved physical and dynamic properties.

Copolymers of the above general class, particularly where the copolymers contain about 85 to 99.5 weight percent of a $C_4$ to $C_8$ isoolefin, e.g. isobutylene, 3-methyl-butene-1, with about 15 to 0.5 weight percent of a multi-olefin of about 4 to 14 carbon atoms, e.g. myrcene, isoprene, butadiene, etc. are well known in the literature as "butyl rubber." For example, see "Synthetic Rubber," by G. S. Whitby (1954), and U.S. Patent 2,356,128, among many others. Halogenated butyl rubber-type copolymers are produced by halogenating butyl rubber in a manner which does not substantially degrade its molecular weight, but however gives a rubbery product of substantially different properties than the unhalogenated material. Butyl rubber may be halogenated at temperatures of —50 to 200° C., preferably 0 to 100° C., at pressures of 0.5 to 900 p.s.i.a. with suitable halogenating agents such as gaseous chlorine, liquid bromine, iodine monochloride, etc. Halogenation may be accomplished in various ways. For example, the halogenation agent, e.g. chlorine, may be added to a solution of the copolymer in a suitable inert liquid organic solvent. The resulting halogenated polymer may be recovered by precipitation with a nonsolvent at about 0 to 180° C., spray drying, or by flashing off the hydrocarbon solvent by injection into a hot water bath.

Preferably, the degree of halogenation is carefully regulated so that the halogenated copolymer contains at least 0.5 weight per cent of combined halogen, but not more than about one atom of combined fluorine or chlorine per double bond in the polymer, nor more than three atoms of combined bromine or iodine per double bond. A more detailed description of the formation of chlorinated butyl rubber may be had by referring to co-assigned Serial No. 512,182, filed May 31, 1955, now U.S. Patent No. 2,944,578.

The halogenated copolymer has a viscosity average molecular weight of about 100,000 to 2,000,000 and a mole percent unsaturation of between 0.1 to 20, preferably less than 10. As hereinafter employed in the specification, the term "halogenated butyl rubber" denotes the above described halogenated copolymers of a major portion of a $C_4$ to $C_8$ isoolefin and a minor portion of a $C_4$ to $C_{14}$ multiolefin.

Although halogenated butyl rubber can be used in the manufacture of numerous articles, because of its relatively low degree of unsaturation, it does not cure as quickly as other more highly unsaturated rubbery polymers. Thus there exists a need for a system whereby halogenated butyl rubber may be more rapidly cured to give a vulcanizate of good physical properties. Such a cure system is particularly desired in applications of halogenated butyl rubber such as wire coating, conveyor belting and extrusion and molding of various items.

In accordance with the present invention, halogenated butyl rubber may be rapidly cured to give a vulcanizate having improved physical and dynamic properties, as well as being more amenable to oil extension. More particularly, it now has been found that excellent cures are obtained by curing halogenated butyl rubber with a minor proportion based on rubbery polymer of a thioaldehyde polymer.

Curing may be effected under a broad range of temperatures, e.g. 200 to 400° F., preferably 250 to 350° F., as well as under various conditions, e.g. open steam heating, oven curing, during extrusion or molding, etc. Generally, about 0.1 to 20, preferably 0.5 to 10, and particularly 1 to 8, weight percent based on halogenated polymer of a thioaldehyde polymer is employed in the vulcanization recipe. Normally, the thioaldehyde polymer is the principal curing agent in the halogenated butyl composition. Although less desirable, small amounts, e.g. 0.1 to 2 weight percent based on rubber, of a thioaldehyde polymer may be used as a vulcanization accelerator for conventional cure systems.

Preferably, the thioaldehyde polymer is employed in conjunction with minor proportions based on rubber, e.g. 1 to 20%, of a metal oxide such as zinc oxide, stannous oxide, or magnesium oxide and/or minor proportions, e.g. 1 to 15 weight percent based on rubber of phenolic materials such as phenolformaldehyde resins prepared by reaction of an aldehyde with a phenol, or phenol, resorcinol, pyrogallol, etc. and particularly nonyl phenol. The recipes may contain 1 to 15 weight percent of such materials as sulfur, amines, paraformaldehyde, conventional rubber accelerators, etc.

Vulcanization recipes prepared in accordance with the present invention may contain various additional materials such as carbon black, mineral fillers, pigments, antioxidants, extender oils, antitack agents, etc. If desired, blends of halogenated butyl and other rubbery polymers, e.g. natural rubber, neoprene, etc. may be covulcanized by the thioaldehyde polymers of the present invention.

The term "thioaldehyde polymer," as employed in the present specification, denotes thioformaldehyde trimer and its derivatives wherein one or more of the hydrogen atoms in the three methylene groups are substituted, e.g. by alkyl, aryl or aralkyl substituents. Examples of thioaldehyde polymers are: thioformaldehyde trimer, thioacetaldehyde trimer, thiobenzaldehyde trimer, thiooctanal trimer, thiophenacetaldehyde trimer.

The thialdehyde polymer has the structure:

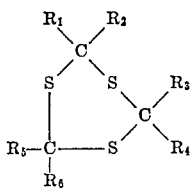

where the R group is chosen from the group consisting of hydrogen, $C_1$ to $C_{30}$ alkyl, aryl or aralkyl groups.

They may be formed by the action of hydrogen sulfide on an aldehyde, preferably in the presence of hydrogen chloride as a catalyst. The monomeric thioaldehydes are almost unknown since they change easily to the trimer. Where all of the R groups are alkyls or aryls, for example, the trimer is a derivative of a thioketone, e.g. thioacetone. The thioketone trimers are similarly useful in the present application. The monomeric thioketones are only slightly more stable as the monomer than the thioaldehydes and are more commonly handled as the trimers. Preferably, thioformaldehyde trimer is employed in the compositions of the present invention.

The various aspects and modifications of the present invention will be made more clearly apparent by reference to the following description and accompanying examples.

EXAMPLES 1 TO 8

A typical halogenated butyl rubber hereinafter denoted "chlorinated butyl rubber A" was compounded with the various ingredients shown in Table I; the relative proportions of each component being shown in parts by weight. Mixing was effected on a rubber mill in a conventional manner. Chlorinated butyl rubber A had the following properties:

98 weight percent isobutylene
2 weight percent isoprene
1.3 weight percent chlorine
Mole percent unsaturation—0.8
Viscosity average molecular weight—375,000
Mooney viscosity—52 (8 minutes at 212° F.)

After preparing compounds 1 to 8 according to the formulations indicated in Table I, portions of the samples were cured at 307° F. for periods of 15 minutes, and for 45 minutes. The physical and dynamic properties of the resulting vulcanizates are shown in Table I.

*Table I*

| Compound | 1 | 2 | 3 | 4 | 5 | 6 | 7 | 8 |
|---|---|---|---|---|---|---|---|---|
| Chlorinated butyl rubber A | 100 | 100 | 100 | 100 | 100 | 100 | 100 | 100 |
| Philblack-O (carbon black) | 50 | 50 | 50 | 50 | 50 | 50 | 50 | 50 |
| Stearic acid | 1 | 1 | 1 | 1 | 1 | 1 | 1 | 1 |
| Zinc oxide | 5 | 5 | 5 | 5 | 5 | 5 | 5 | 5 |
| Cyclic thioformaldehyde trimer | | 2 | 5 | 5 | | 2 | 2 | |
| Tuads (tetramethyl thiuram disulfide) | | | | | 2 | 2 | | 2 |
| Sulfur | | | | | | | 2 | 2 |
| Nonyl phenol | | | | 5 | | | | |
| Properties: | | | | | | | | |
| Cured 15 minutes at 307° F.: | | | | | | | | |
|   Modulus, p.s.i./300% | 285 | | | 1,690 | | 2,100 | | |
|   Tensile, p.s.i | 450 | 2,670 | 2,185 | 2,415 | | 2,740 | 2,635 | |
|   Elongation, percent | 700 | 265 | 255 | 425 | | 405 | 285 | |
| Cured 30 minutes at 307° F.: | | | | | | | | |
|   Modulus, p.s.i./300% | 1,300 | | | 1,650 | | 2,040 | | |
|   Tensile, p.s.i | 2,000 | 2,245 | 2,250 | 2,500 | | 2,630 | 2,515 | |
|   Elongation, percent | 400 | 250 | 255 | 435 | | 400 | 285 | |
| Cured 45 minutes at 307° F.: | | | | | | | | |
|   Modulus, p.s.i./300% | 1,465 | | | 1,610 | | 2,150 | | |
|   Tensile, p.s.i | 2,050 | 2,360 | 2,250 | 2,500 | | 2,480 | 2,470 | |
|   Elongation, percent | 410 | 245 | 255 | 435 | | 385 | 285 | |
| Air oven aging (48 hrs. at 300° F.) cured 45 minutes at 307° F.: | | | | | | | | |
|   Modulus, p.s.i./300% | 160 | | | | 190 | 525 | | |
|   Tensile, p.s.i | 160 | 730 | | | 190 | 525 | 680 | |
|   Elongation, percent | 360 | 240 | | | 310 | 300 | 270 | |
| Goodrich flexometer (45 minutes at 307° F.): | | | | | | | | |
|   Dynamic drift, percent | | −1.2 | −0.7 | 0.0 | | −0.6 | 1.1 | 7.8 |
|   Final dynamic compression, percent | Failed | −3.0 | 1.5 | 9.1 | | 2.6 | 2.7 | 11.0 |
|   Compression set, percent | | 0.0 | 0.9 | 1.6 | | 1.8 | 4.1 | 7.6 |
|   Max. temperature rise, ° C | | 20 | 21 | 21 | | 27 | 25 | 28 |
|   To max. temperature, min | | 14 | 10 | 22 | | 10 | 12 | 16 |

As shown in Table I, the use of thioformaldehyde trimer as a curing agent gave vulcanizates of improved physical properties when employing a relatively short curing period, i.e. 15 minutes, as compared to a conventional cure of zinc oxide (Compound 1). Moreover, vulcanizates obtained by the use of a thioformaldehyde trimer gave better physical properties and considerably better dynamic properties than conventional cure systems (Compounds 1 and 8) when cured for a longer period of time, as well as better heat aging characteristics. Compound 4 demonstrates that a particularly advantageous result is obtained by employing a thioformaldehyde trimer in conjunction with a phenolic material, e.g. nonylphenol, unusually fast, tight cures thereby being obtained.

EXAMPLES 9 TO 16

A typical brominated butyl rubber hereinafter denoted "brominated butyl rubber B" was compounded with the various ingredients shown in Table II; the relative proportions of each component being shown in parts by weight. Mixing was effected on a rubber mill in a conventional manner. Brominated butyl rubber B had the following properties:

98 weight percent isobutylene
2 weight percent isoprene
2.3 weight percent bromine Mole percent unsaturation—0.7
Viscosity average molecular weight—400,000
Mooney viscosity—56 (8 minutes at 212° F.)

After preparing samples according to the formulations indicated in Table II, the samples were cured at 307° F. for periods of 15 minutes and 45 minutes. The physical and dynamic properties of the resulting vulcanizates are shown in Table II.

multiolefin, and 0.1 to 20 wt. percent, based on copolymer, of a thioaldehyde trimer.

2. The composition of claim 1 wherein said thioaldehyde trimer comprises 0.5 to 10 wt. percent, based on copolymer, of said composition.

3. The composition of claim 1 which additionally contains a minor proportion of a member selected from the group consisting of phenolic materials and metal oxides.

*Table II*

CURING BROMINATED BUTYL WITH TRITHIOMETHYLENE SYSTEMS

| Compound | 9 | 10 | 11 | 12 | 13 | 14 | 15 | 16 |
|---|---|---|---|---|---|---|---|---|
| Brominated butyl rubber B | 100 | 100 | 100 | 100 | 100 | 100 | 100 | 100 |
| Philblack-O (carbon black) | 50 | 50 | 50 | 50 | 50 | 50 | 50 | 50 |
| Stearic acid | 1 | 1 | 1 | 1 | 1 | 1 | 1 | 1 |
| Zinc oxide | | 5 | 5 | 5 | | 5 | 5 | 5 |
| Cyclic thioformaldehyde trimer | 3 | 3 | 1 | 3 | | | | 1.5 |
| Paraformaldehyde | | | | | 2.5 | 2.5 | 2.5 | 1.25 |
| Nonyl phenol | | | | 5 | | | 5 | 5 |
| Properties: | | | | | | | | |
| Cured 15 minutes at 307° F.: | | | | | | | | |
| Modulus, p.s.i./300% | 350 | | | 1,600 | 165 | 1,055 | 1,500 | 2,110 |
| Tensile, p.s.i | 450 | 2,015 | 2,135 | 2,250 | 280 | 1,545 | 2,120 | 2,220 |
| Elongation, percent | 480 | 240 | 290 | 405 | 1,050 | 410 | 405 | 320 |
| Cured 45 minutes at 307° F.: | | | | | | | | |
| Modulus, p.s.i./300% | 650 | | | 1,885 | 335 | 1,160 | 1,890 | |
| Tensile, p.s.i | 875 | 2,050 | 2,135 | 2,275 | 620 | 1,535 | 2,055 | 2,145 |
| Elongation, percent | 475 | 215 | 270 | 365 | 570 | 405 | 350 | 280 |
| Air oven aging (48 hrs. at 300° F.) cured 45 minutes at 307° F.: | | | | | | | | |
| Modulus, p.s.i./300% | 250 | | | | | | | |
| Tensile, p.s.i | 300 | 445 | 585 | 1,015 | | 280 | 555 | 1,150 |
| Elongation, percent | 450 | 235 | 255 | 285 | | 175 | 400 | 200 |
| Goodrich flexometer, cured 45 minutes at 307° F.: | | | | | | | | |
| Dynamic drift, percent | | 0 | 0 | 0 | | −1.1 | 2.0 | 2.1 |
| Final dynamic compression, percent | | −0.4 | 1.8 | 5.3 | | 11.0 | 11.2 | 4.5 |
| Compression set, percent | | 0.7 | 1.0 | 1.7 | | 3.2 | 5.0 | 3.3 |
| Max. temperature rise, °C | | 19 | 25 | 23 | | 37 | 27 | 19 |
| To max. temperature, min | | 12 | 14 | 14 | | 10 | 16 | 14 |

As shown in Table II, thioformaldehyde trimer, particularly in the presence of zinc oxide, gave good vulcanizates in short curing times. The presence of minor portions of paraformaldehyde or nonyl phenol gave vulcanizates of particularly good heat aging properties. A combination of thioformaldehyde trimer, nonyl phenol and paraformaldehyde was particularly outstanding in heat aging properties.

It is noted that when thioformaldehyde trimer was employed to cure unhalogenated butyl rubber (with or without the presence of nonyl phenol and/or zinc oxide), relatively poor vulcanizates were obtained, thus evidencing the unique nature of the improved vulcanizates of the present invention.

Having described the invention, that which is sought to be protected is set forth in the following claims.

What is claimed is:

1. A composition comprising a halogenated rubbery copolymer of about 85 to 99.5 wt. percent of a $C_4$ to $C_8$ isoolefin and about 15 to 0.5 wt. percent of a $C_4$ to $C_{14}$ 4. The composition of claim 1 which additionally contains a minor proportion of nonylphenol.

5. The composition of claim 1 which additionally contains a minor proportion of nonylphenol and paraformaldehyde.

6. The composition of claim 1 in which the halogenated rubbery copolymer is a chlorinated rubbery copolymer containing at least 0.5 wt. percent of combined chlorine but no more than 1 atom of combined chlorine per double bond in the copolymer.

7. The composition of claim 1 in which the halogenated rubbery copolymer is a brominated rubbery copolymer containing at least 0.5 wt. percent of combined bromine but no more than 3 atoms of combined bromine double bond in the copolymer.

8. The composition of claim 1 wherein said thioaldehyde trimer is thioformaldehyde trimer.

References Cited in the file of this patent

UNITED STATES PATENTS 2,952,657    Serniuk _____ Sept. 13, 1960